(12) United States Patent
Zhang et al.

(10) Patent No.: US 12,239,502 B2
(45) Date of Patent: Mar. 4, 2025

(54) PERSONAL CARE SYSTEM AND METHOD

(71) Applicant: Colgate-Palmolive Company, New York, NY (US)

(72) Inventors: Xiaonan Zhang, Hillsborough, NJ (US); Yongxing Wu, Guangzhou (CN)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 18/304,009

(22) Filed: Apr. 20, 2023

(65) Prior Publication Data

US 2023/0255737 A1    Aug. 17, 2023

Related U.S. Application Data

(62) Division of application No. 17/079,713, filed on Oct. 26, 2020, now Pat. No. 11,654,008.

(51) Int. Cl.
    A61C 17/34      (2006.01)
    A61C 17/22      (2006.01)
    H03K 17/98      (2006.01)

(52) U.S. Cl.
    CPC ............ *A61C 17/34* (2013.01); *A61C 17/221* (2013.01); *A61C 17/225* (2013.01); *H03K 17/98* (2013.01)

(58) Field of Classification Search
    CPC .... H03K 17/98; A61C 17/221; A61C 17/225; A61C 17/34
    USPC ........................................................ 15/21.1
    See application file for complete search history.

(56) References Cited

U.S. PATENT DOCUMENTS

| | | |
|---|---|---|
| 7,603,777 B2 | 10/2009 | Shumizu |
| 8,089,227 B2 | 1/2012 | Baertschi et al. |
| 8,198,866 B2 | 6/2012 | Vetter |
| 8,533,892 B2 | 9/2013 | Dabrowski |
| 8,756,743 B2 | 6/2014 | Baertschi et al. |
| 10,172,697 B2 * | 1/2019 | Bloch .................... H03K 17/98 |
| 10,695,153 B2 | 6/2020 | Huang et al. |
| 10,813,731 B2 | 10/2020 | Shreve |
| 11,096,476 B2 | 8/2021 | Peng et al. |

(Continued)

FOREIGN PATENT DOCUMENTS

| | | |
|---|---|---|
| CN | 201194366 | 2/2009 |
| CN | 108403242 | 8/2018 |

(Continued)

OTHER PUBLICATIONS

International Search Report and Written Opinion of the International Searching Authority issued in PCT International Application No. PCT/US2021/054376 mailed Mar. 21, 2022.

*Primary Examiner* — Katina N. Henson (57) ABSTRACT

In one embodiment, a personal care appliance includes an electric motor having a drive shaft. In response to a voltage signal, the drive shaft is oscillated in an oscillatory motion having an oscillation amplitude. A control circuit includes, in operable cooperation, a user interface, a processor, a pulse width modulation signal generator, and a power source. The control circuit supplies the voltage signal to the electric motor, the voltage signal having a frequency and a duty cycle. The control circuit varies the frequency and the duty cycle of the voltage signal in response to an oscillation adjustment input received from the user interface so that the oscillation amplitude of the drive shaft is varied along a substantially linear rate of change profile relative to the frequency.

18 Claims, 7 Drawing Sheets

(56) References Cited

U.S. PATENT DOCUMENTS

| | | |
|---|---|---|
| 11,654,008 B2 | 5/2023 | Zhang |
| 2011/0005015 A1 | 1/2011 | Iwahori et al. |
| 2012/0036657 A1 | 2/2012 | Iwahori et al. |
| 2013/0177863 A1* | 7/2013 | Shreve ............... A46B 15/0008 433/27 |
| 2014/0096332 A1 | 4/2014 | Kitagawa et al. |
| 2014/0340009 A1* | 11/2014 | Reynolds ................ H02P 6/182 318/400.11 |
| 2022/0125566 A1 | 4/2022 | Zhang et al. |

FOREIGN PATENT DOCUMENTS

| | | |
|---|---|---|
| EP | 3370338 A1 | 9/2018 |
| WO | 2007/107274 | 9/2007 |
| WO | 2015/092597 | 6/2015 |
| WO | 2022/093522 | 5/2022 |

* cited by examiner

PERSONAL CARE SYSTEM AND METHOD

CROSS-REFERENCE TO RELATED APPLICATIONS

The present application is a divisional of U.S. patent application Ser. No. 17/079,713, filed Oct. 26, 2020, the entirety of which is incorporated herein by reference.

BACKGROUND

Electric toothbrushes are well known from moving a brush head or its components to promote teeth cleaning. Some such toothbrushes move the brush head in an oscillating motion. There is need, however, for an electric toothbrush having an oscillating motion that can adjust smoothly and continuously from one intensity to another without steps or jumping in the oscillation.

BRIEF SUMMARY

The present invention is directed to a personal care appliance and a method for controlling same. In one aspect, a personal care appliance includes an electric motor having a drive shaft, the electric motor configured to, in response to a voltage signal, oscillate the drive shaft in an oscillatory motion having an oscillation amplitude; and a control circuit comprising, in operable cooperation, a user interface, a processor, a pulse width modulation signal generator, and a power source, the control circuit operably coupled to the electric motor and configured to supply the voltage signal to the electric motor, the voltage signal having a frequency and a duty cycle, the control circuit configured to vary the frequency and the duty cycle of the voltage signal in response to an oscillation adjustment input received from the user interface so that the oscillation amplitude of the drive shaft is varied along a substantially linear rate of change profile relative to the frequency.

In another aspect, a method of controlling a personal care appliance comprising an electric motor having a drive shaft and a control circuit comprising, in operable cooperation, a user interface, a processor, a pulse width modulation signal generator, a memory unit, and a power source, the control circuit operably coupled to the electric motor, is disclosed. The method includes generating, with the control circuit, a voltage signal having a frequency and a duty cycle; supplying the voltage signal to the electric motor to oscillate the drive shaft in an oscillatory motion having an oscillation amplitude; and the control circuit varying the frequency and the duty cycle of the voltage signal in response to an oscillation adjustment input received from the user interface so that the oscillation amplitude of the drive shaft is varied along a substantially linear rate of change profile relative to the frequency.

In another aspect, a personal care appliance includes an electric motor having a drive shaft, the electric motor configured to, in response to a voltage signal, oscillate the drive shaft in an oscillatory motion having an oscillation amplitude; and a control circuit comprising, in operable cooperation, a user interface, a pulse width modulation signal generator, a processor, a memory unit, and a power source, the control circuit operably coupled to the electric motor and configured to supply the voltage signal to the electric motor, the voltage signal having a frequency and a duty cycle, the control circuit configured to operate the electric motor in accordance with a selected one of the first mode or the second mode in response to a mode selection input from the user interface; wherein when the first mode is selected, the frequency and/or the duty cycle of the voltage signal is varied in response to an oscillation adjustment input received from the user interface so that the oscillation amplitude of the drive shaft is varied along a first rate of change profile relative to the frequency in the first mode; and wherein when the second mode is selected, the frequency and/or the duty cycle of the voltage signal is varied in response to the oscillation adjustment input received from the user interface so that the oscillation amplitude of the drive shaft is varied along a second rate of change profile relative to the frequency in the second mode, the first and second rate of change profiles being different than one another.

In another aspect, a method of controlling a personal care appliance comprising an electric motor having a drive shaft and a control circuit comprising, in operable cooperation, a user interface, a processor, a pulse width modulation signal generator, a memory unit, and a power source, the control circuit operably coupled to the electric motor, is disclosed. The method includes initiating a selected one of a first mode or a second mode in response to a mode selection input from the user interface; generating, with the control circuit, a voltage signal having a frequency and a duty cycle in accordance with the selected one of the first mode or the second mode; supplying the generated voltage signal to the electric motor to oscillate the drive shaft in an oscillatory motion having an oscillation amplitude; and varying the frequency and/or the duty cycle of the generated voltage signal in response to an oscillation adjustment input received from the user interface so that the oscillation amplitude of the drive shaft is varied along a first rate of change profile relative to the frequency when in the first mode; and varying the frequency and/or the duty cycle of the generated voltage signal in response to the oscillation adjustment input received from the user interface so that the oscillation amplitude of the drive shaft is varied along a second rate of change profile relative to the frequency when in the second mode, the first and second rate of change profiles being different than one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

In the following description, where circuits are shown and described, one of skill in the art will recognize that, for the sake of clarity, not all peripheral circuits or components are shown in the figures or described in the description. Further, the terms "couple" and "operably couple" can refer to a direct or indirect coupling of two components of a circuit.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Figure 1:
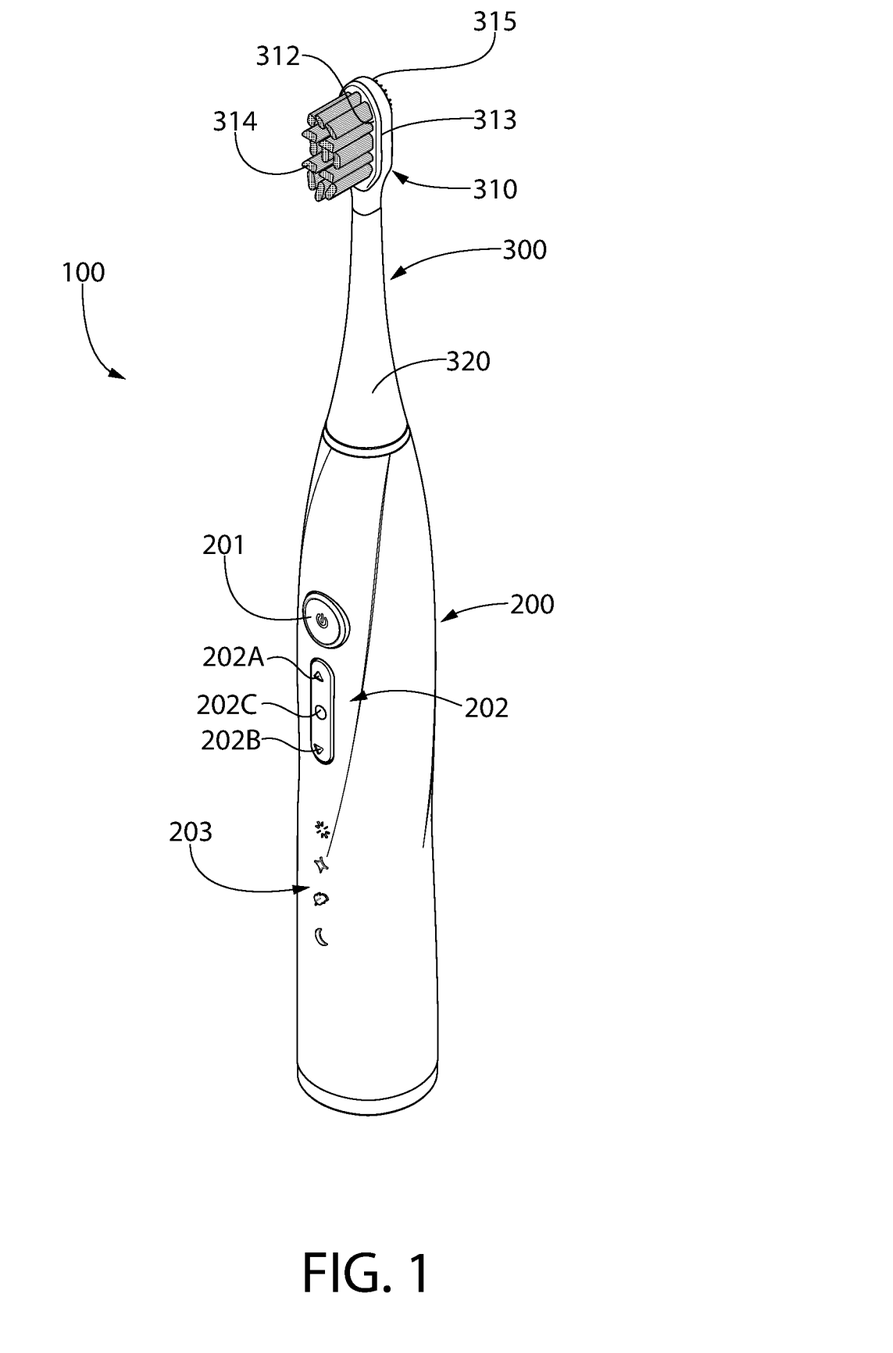
FIGS. 1-2 are perspective views of a personal care appliance according to one embodiment.
Figure 2:
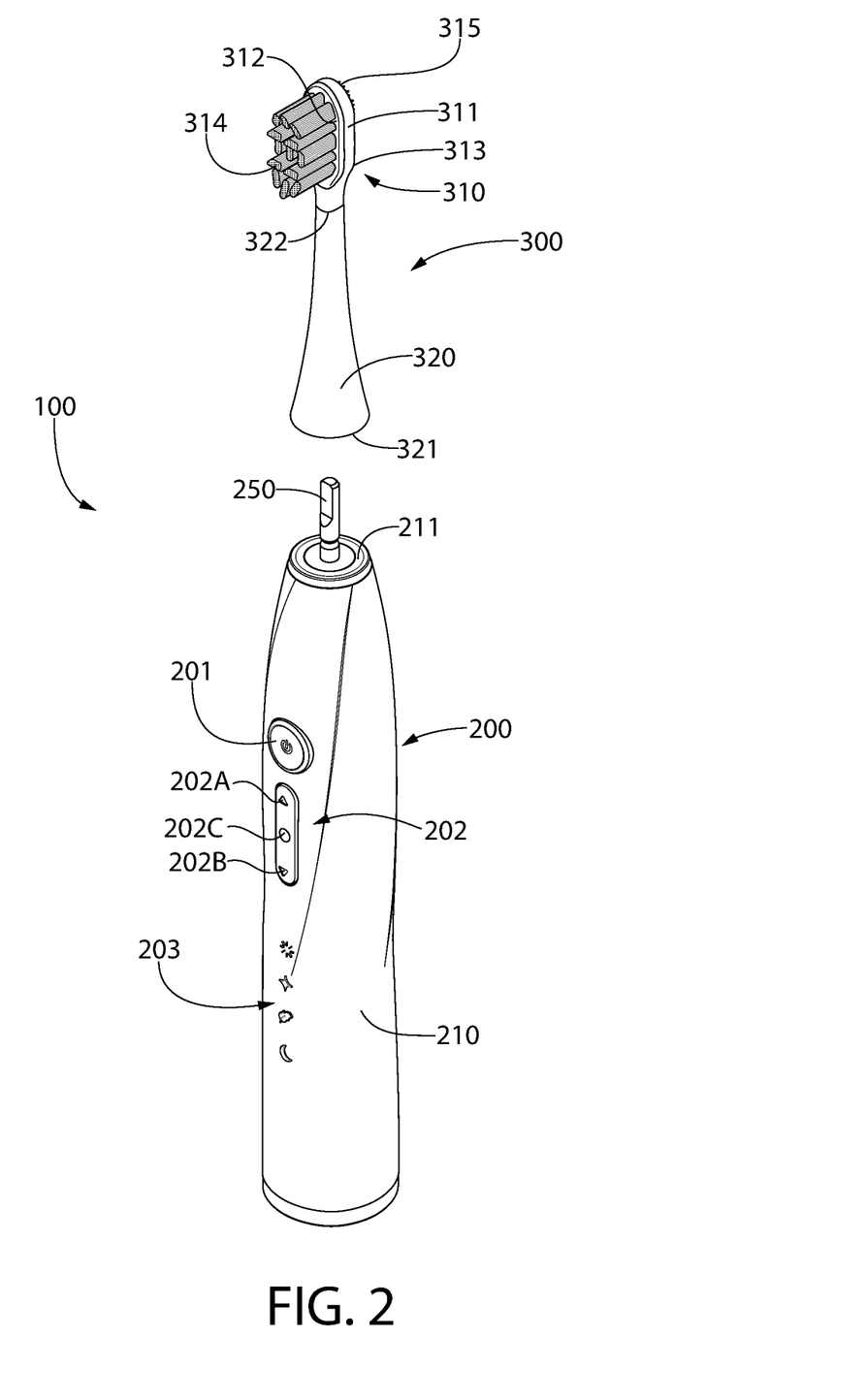

Referring to FIGS. 1-2, an oral care implement 100 will be described in accordance with an embodiment of the present invention. In the exemplified embodiment, the oral care implement 100 is a powered or electric toothbrush. In other embodiments, the oral care implement may be a manual toothbrush. In still other embodiments, the oral care implement 100 may be other hygienic tools for treating the oral cavity such as a tongue scraper, a gum and soft tissue cleanser, a water pick, an interdental device, a tooth polisher, a specially designed ansate implement having tooth engaging elements, or any other type of implement that is commonly used for oral care. In still other embodiments, the oral care implement 100 may be a personal care appliance instead of an oral care implement. Examples of such personal care appliances include hairbrushes, razors, body scrubbers, skin treatment devices, or the like. The oral care implement 100 generally comprises a handle 200 and a workpiece 300, which in this embodiment is an oral care refill head 300. It is to be understood that the inventive concepts discussed herein can be applied to any type of oral care implement or personal care implement unless a specific type of implement is specified in the claims. The structural and functional details of the oral care implement 100 will be provided below in accordance with exemplary embodiments of the present invention.

The handle 200 is the portion of the oral care implement 100 that is gripped by a user during use. The oral care refill head 300 is the portion of the oral care implement 100 that performs the cleaning or other hygienic function. The oral care refill head 300 can be detached from the handle 200, and thus when they are coupled the oral care refill head 300 is detachably coupled to the handle 200. Thus, the oral care refill head 300 may be detached from the handle 200 and replaced with a new oral care refill head 300 when cleaning elements on the oral care refill head 300 become worn over time. This allows the handle 200 to continue to be used while the oral care refill head 300 is exchanged, which is important because the expensive electronic circuitry is located within the handle 200. Multiple users can also use the same handle 200 while placing their individual oral care refill heads thereon prior to use.

The handle 200 comprises a gripping portion 210 that terminates at a distal end surface 211 and a stem 250 protruding from the distal end surface 211 of the gripping portion 210. The gripping portion 210 is the part of the handle 200 that is gripped by a user during oral hygiene activities and it may include various buttons, switches, indicators, lights, user controls, or the like to both allow a user to control functionality and operation of the oral care implement 100 and also provide information to the user. For example, the handle 200 may comprise a power button 201 that can power the oral care implement 100 on and off (and provide power to a motor thereof as described in more detail below).

The handle 200 may also include a user interface 202 for altering the intensity of brushing. In the exemplified user interface, a mode button 202C allows the user to change from one intensity mode to another. In the exemplified embodiment, the intensity modes comprise a first mode (e.g., a low intensity mode) and a second mode (e.g., a high intensity mode), and a user may switch between modes by selecting the mode button 202C. Further, a user may increase or decrease the intensity within a given mode by selecting buttons 202A and 202B, respectively. The invention, however, is not so limited. Any number of modes may be used (e.g., low, medium, and high modes). Further, the mode button 202C may be eliminated and the mode may be changed by alternate means, such as by pressing (quickly or for a long period of time) one or more of the power button 201 and buttons 202A, 202B. For example, the mode may be changed by holding or quickly pressing the power button 201, or by pressing buttons 202A, 202B at the same time, or by pressing one of the buttons 202A, 202B quickly or slowly. In other embodiments, pressing the up button 202A repeatedly will cause a brush in a low mode to increase its brushing intensity in the low mode until it enters a higher mode, and continued pressing of the up button 202A would increase the intensity in the higher mode. Similarly, pressing the down button 202B repeatedly will cause a brush in a high mode to decrease its brushing intensity in the high mode until it enters a lower mode, and continued pressing of the down button 202B would decrease the intensity in the lower mode. Note that the user interface is not limited to the buttons shown in FIG. 1. It may comprise any type of interface, such as a button, dial, or screen. In yet other embodiments, the implement 100 may wirelessly communicate with an electronic device, such as a smartphone. For example, the user interface may be a touchscreen or another interface of the electronic device. In yet other embodiments, the mode may be altered by sensing a shaking or other movement of the brush.

The handle 200 may also include various indicators 203 that may be activated (e.g., lights that may be illuminated) to inform a user when the battery is low, when the user is brushing with too much pressure, when the oral care implement 100 is powered on, and various other information that may be helpful to a user.

As noted above, the exemplified handle 200 houses the electronic components associated with the oral care implement 100. The exemplified gripping portion 210 of the handle 200 houses a motor 130 and control circuit 150 discussed in detail below (see FIGS. 5-7). The stem 250 is operably coupled to the motor 130 and may form a portion of a drive shaft of the motor 130 or the stem 250 may be operably coupled to a drive shaft of the motor 130. For example, the stem 250 may form a distal portion of the drive shaft of the motor 130. In some embodiments, the stem 250 may be a plastic housing or the like that surrounds the drive shaft of the motor 130 with the plastic housing that surrounds the drive shaft forming the coupling between the handle 200 and the oral care refill head 300. In the exemplified embodiment, the stem 250 is operably coupled to the motor 130 and due to that coupling, upon activating the motor 130 by powering on the oral care implement 100, the motor's drive shaft will impart movement to the stem 250 thereby causing the stem 250 to rotate, oscillate, or the like.

Figures 3A, 3B:
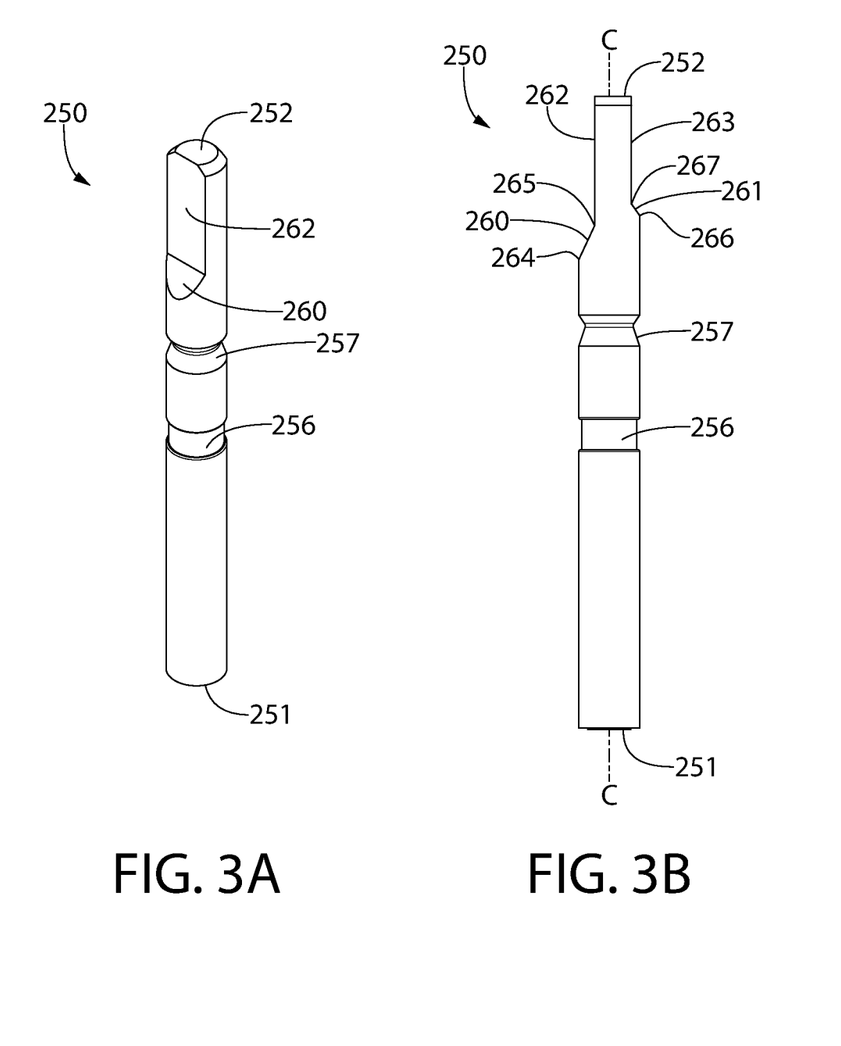
FIGS. 3A-C are different views of a stem of the personal care appliance of FIGS. 1-2.
Figure 3C:
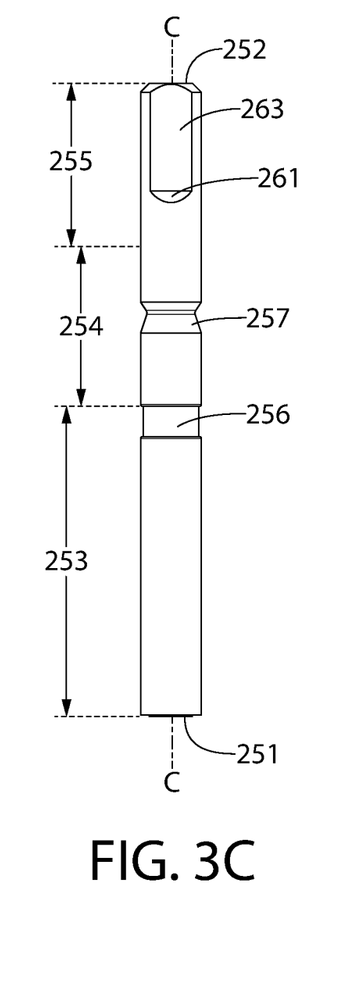
Figure 4:
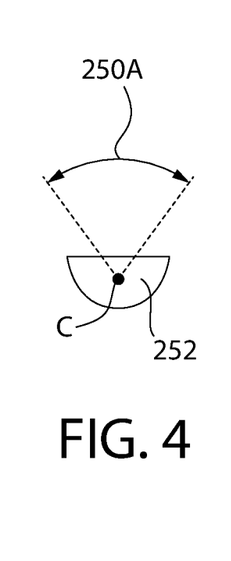
FIG. 4 is top view of a stem of the personal care appliance showing the oscillation amplitude for the stem according to one embodiment.

FIGS. 3A-C and 4 show the stem separate from the implement 100. FIG. 4 shows the oscillation of the distal end 252 of the stem 250. The rotation about point C causes the stem to have a swing angle 250A. This swing or rotation is a type of oscillation whose swing angle is a type of oscillation amplitude. The invention, however, is not so limited. In other embodiments, the oscillation amplitude may be a magnitude of a different type of oscillating movement, such as a back-and-forth non-rotational movement.

Returning to the exemplified embodiment, when the oral care refill head 300 is coupled to the handle 200, the oscillation of the stem 250 will cause oscillation of the oral care refill head 300, or at least the cleaning elements thereof, to optimize the cleaning performance. The stem 250 forms the feature of the handle 200 that couples to the oral care refill head 300 and also imparts movement to the cleaning elements of the oral care refill head 300.

Figure 8:
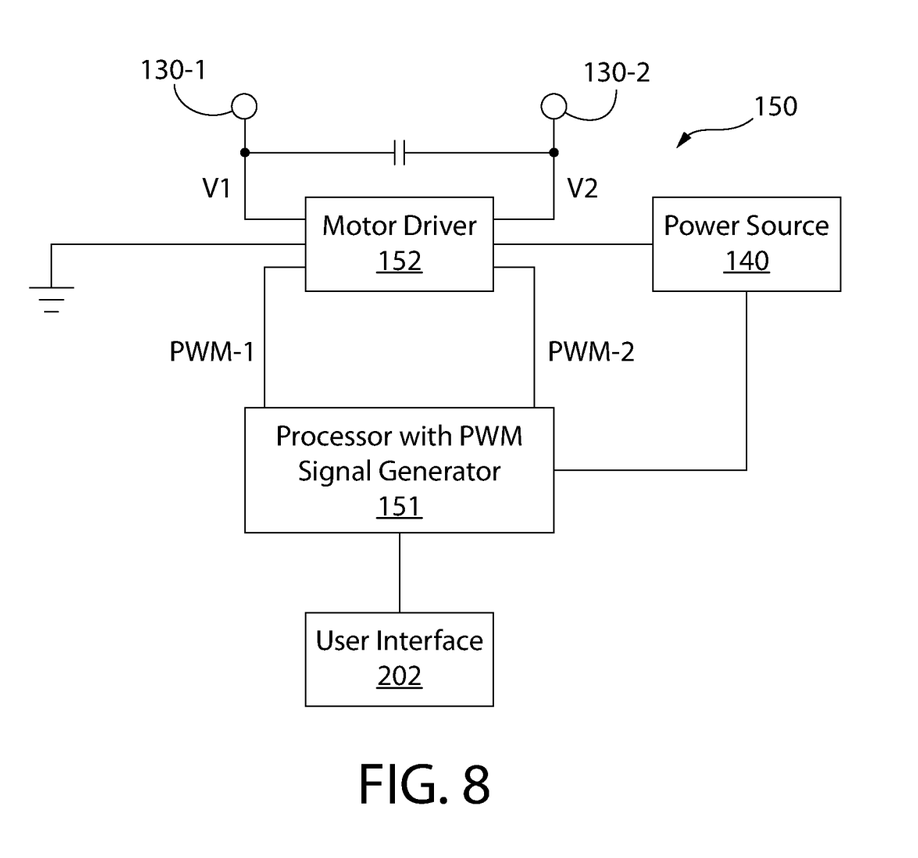
FIG. 8 is block diagram of a control circuit for controlling the oscillation of a stem of a personal care appliance according to one embodiment.

As discussed in further detail in FIG. 8, there is a control circuit 150 in the handle 200. In the exemplified embodiment, the control circuit 150 comprises a printed circuit board (not shown) having several electronic components thereon in electrical communication with one another. The control circuit 150 may further include components located elsewhere. For example, the control circuit 150 may comprise or be in communication with the user interface 202 for adjusting the oscillation amplitude and power button 201. The intensity button 202C may be in operable coupling with the control circuit 150 so that pressing the intensity button 202C causes a change in the mode (e.g., from a low intensity mode to a high intensity mode). Further, the buttons 202A, 202B may be in operable communication with the control circuit so that pressing them causes a gradual increase or decrease in the motor intensity or speed. As discussed above, in other embodiments, the mode can be switched by other means.

The indicators 203 may be formed by transparent portions of the handle 200 that are aligned with light sources of the control circuit 150 that illuminate when different thresholds are met. For example, when the battery power is below a threshold, a low battery light may illuminate and be seen through a transparent portion of the handle 200 (such as an icon that is readily identifiable as a battery power indicator). Furthermore, when excessive pressure is felt during brushing, a high pressure light may illuminate. Of course, other indicators 203 may be used to provide different indications to a user as desired. The control circuit 150 may comprise a controller or processor that receives input from the various actuators and transmits instructions to the power source 130, motor 140, and various light sources to activate and deactivate accordingly. However, a processor or controller is not needed in all embodiments and in other embodiments activating and deactivating the various actuators opens and closes a switch which either causes power to be supplied to or prevents power from being supplied to the various components for activation and deactivation thereof. The various actuators that may form part of the control circuit 150 may be various switches including trigger switches, contact switches, conductive switches, throw switches, push button switches, pressure switches, toggle switches, or other mechanical type switches. In other embodiments electronic switches could be used in place of the mechanical type switches.

Turning again to FIGS. 1 and 2, the oral care refill head 300 comprises a head portion 310 and an attachment portion 320. The head portion 310 comprises an oral treatment tool (or head structure) 311 having a front surface 312 and a rear surface 313. Furthermore, the head portion 310 comprises a plurality of tooth cleaning elements 314 extending from the front surface 312 of the oral treatment tool 311. The plurality of tooth cleaning elements 314 may comprise bristle tufts, filament bristles, fiber bristles, nylon bristles, polybutylene terephthalate (PBT) bristles, spiral bristles, rubber bristles, elastomeric protrusions, flexible polymer protrusions, lamella, combinations thereof, and/or structures containing such materials or combinations. Thus, any combination of these elements may be used to form one or more of the tooth cleaning elements 314 in some embodiments. Furthermore, where bristles are used for one or more of the tooth cleaning elements 314, such bristles can be tapered, end-rounded, spiral, or the like. The tooth cleaning elements 314 may be coupled to the head portion 310 using any known techniques such as staples, anchor-free tufting, in-mold tufting, PTT, or the like. In the exemplified embodiment, the tooth cleaning elements 314 comprises a plurality of tufts of bristles arranged in a particular pattern on the head portion 310. Of course, the particular pattern of the tooth cleaning elements 314 is not to be limiting of the present invention unless specifically claimed as such.

Furthermore, in the exemplified embodiment there is a soft tissue cleaner 315 positioned on the rear surface 313 of the head portion 310 of the oral care refill head 300. The soft tissue cleaner 315 may be an elastomeric material such as thermoplastic elastomer that is injection molded onto the rear surface 313 of the head portion 310. The soft tissue cleaner 315 may include a pad portion 316 and a plurality of protuberances 317 protruding from the pad portion 316 (see FIG. 3 for best illustration of pad portion 316 and protuberances 317). Alternatively, the soft tissue cleaner 315 may include ridges, depressions, nubs, or any desirable feature for cleaning and/or scraping the tongue and its papillae.

Referring to FIGS. 3A-C, the stem 250 as well as its interaction with various components of the oral care refill head 300 will be described. The exemplified stem 250 comprises a proximal stem section 253 that is located within the interior of the gripping section 210 of the handle 200 when the stem 250 is coupled to the handle 200, a base stem section 254, and a distal stem section 255. The proximal stem section 253 may form the drive shaft of the motor 140 in some embodiments. In other embodiments, stem 250 may comprise only the base stem section 254 and the distal stem section 255, which form a distal portion of a drive shaft of the motor 140 with the remainder of the drive shaft of the motor 140 being formed by the proximal stem section 253. The base stem section 254 is located between the proximal stem section 253 and the distal stem section 255. As noted above, the proximal stem section 253 is located within the interior of the handle 200, the base stem section 254 protrudes from and is adjacent to the gripping portion 210 of the handle 200, and the distal stem section 255 extends from the base stem section 254 to the distal end 252. In some embodiments, the stem 250 may comprise only the portions thereof that extend from the distal end surface 211 of the gripping portion 210 of the handle 200 (i.e., the base stem section 254 and the distal stem section 255).

The stem 250 comprises an annular groove 256 located in the proximal stem section 253. The annular groove 256 is configured to mate with a member of the handle 200. The stem 250 also comprises a locking depression 257 located along the base stem section 254 of the stem 250 for engaging the refill head 300. In the exemplified embodiment, the locking depression 257 is an annular depression 257 that extends around the entire circumference of the stem 250. Thus, the locking depression 257 extends 360 degrees around the stem 250. However, in other embodiments the locking depression 257 may extend along a part but not the entirety of the circumference of the stem 250. In the exemplified embodiment, the locking depression 257 has a V-shaped cross-section, although the invention is not to be so limited in all embodiments and the cross-sectional shape of the locking depression 257 could be modified so long as it is configured to matingly engage the refill head 300. The exemplified stem 250 is configured for detachable coupling to the refill head 300.

The distal stem section 255 of the stem 250 comprises a first radial planar shoulder 260 located on a first side of the stem axis C-C and a second radial planar shoulder 261 located on a second side of the stem axis C-C that is opposite the first side of the stem axis C-C. The distal stem section 255 of the stem 250 further comprises a first planar surface 262 extending from the first radial planar shoulder 260 to the distal end 252 and a second planar surface 263 extending from the second radial planar shoulder 261 to the distal end 252. The first planar surface 262 and the first radial planar shoulder 260 are located on a first side of the stem axis C-C and the second planar surface 263 and the second radial planar shoulder 261 are located on a second side of the stem axis C-C. The first and second planar surfaces 262, 263 are oriented substantially parallel to one another and to the stem axis C-C. (the term substantially allowing for a range of plus or minus 5°). In some embodiments, the first and second planar surfaces 262, 263 may be exactly parallel to one another and to the stem axis C-C. The first and second planar surfaces 262, 263 are flat faces on the stem 250 which is otherwise round. Thus, the portions of the outer surface of the stem 250 between the first and second planar surfaces 262, 263 along the distal stem section 255 are round or arcuate.

The first and second radial planar shoulders 260, 261 are aligned along the stem axis C-C. Thus, there is no transverse axis (oriented perpendicular to the stem axis C-C) that would intersect any part of the first radial planar shoulder 260 and also intersect a part of the second radial planar shoulder 261. Rather, the first and second radial planar shoulders 260, 261 are located at entirely different axial heights along the stem 250. Stated another way, the first radial planar shoulder 260 extends from a first end 264 to a second end 265, the first end 264 being closer to the proximal end 251 than the second end 265. The second radial planar shoulder 261 extends from a first end 266 to a second end 267, the first end 266 being closer to the proximal end 251 than the second end 267. The second end 265 of the first radial planar shoulder 260 is located closer to the proximal end 251 of the stem 250 than the first end 266 of the second radial planar shoulder 261 (or, the first end 266 of the second radial planar shoulder 261 is located closer to the distal end 252 of the stem 250 than the second end 265 of the first radial planar shoulder 260).

Figure 5:
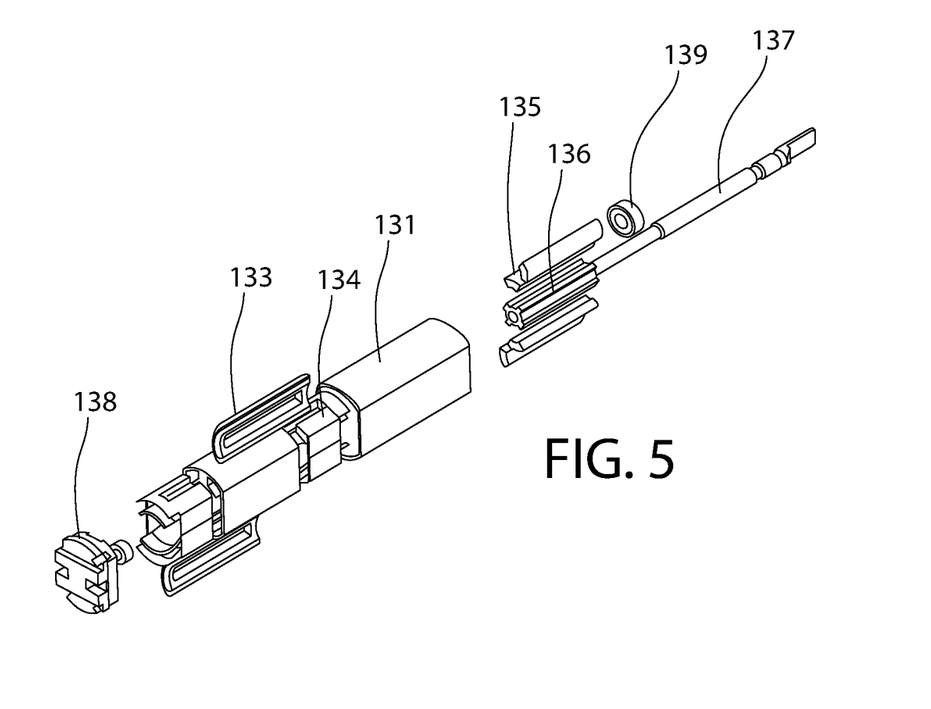
FIGS. 5-7 are views of a motor of the personal care appliance according to one embodiment.
Figure 6:
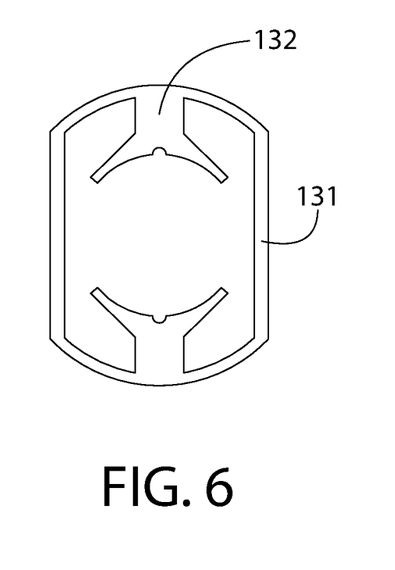
Figure 7:
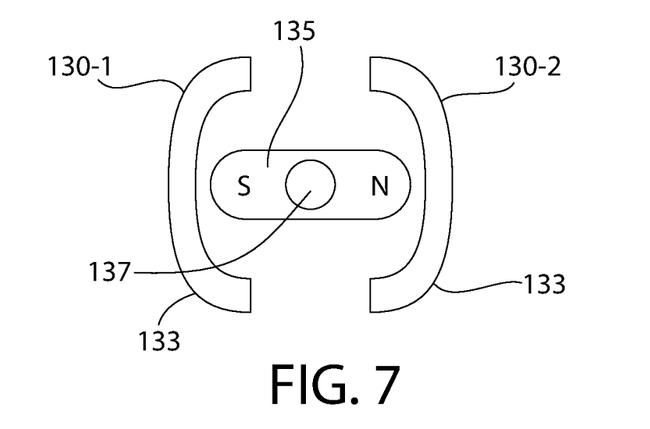

FIGS. 5-7 show a motor 130 and its components according to one embodiment. The exemplified motor 130 utilizes an electromagnetic coil and permanent magnets coupled to the drive shaft as the rotor. While a brief description of the motor 130 is provided below, U.S. Pub. No. 2018263743 is incorporated herein by reference in its entirety for further information on the exemplified motor. The invention is not limited to the exemplified motor, however, as other types of motors may be utilized to carry out the invention.

The exemplified motor 130 includes a motor housing 131, a stator core 132 having at least two poles fixedly installed in the stator housing 131 symmetrically, an electromagnetic coil 133 wound around the stator core 132, and an insulating coil holder 134 for insulating the stator core 132 from the coil winding 133. The motor 130 further includes at least two pairs of permanent magnets 135 cooperating with the stator core 132. The permanent magnets 135 are all fixedly connected to a periphery of a shaft coupling 136, and the shaft coupling 136 is fixedly connected to a drive shaft 137. When the motor 130 is activated by a voltage signal, the coil winding 133 is electrified to generate a magnetic field at the stator core 132, the magnetic field drives the permanent magnets 135 to drive the shaft coupling 136 to rotate, and in turn the motor shaft 137 is driven to move. The angle of rotation 250A of the drive shaft is shown in FIG. 4, and is a type of oscillation amplitude. The charge of the coil windings 133 are alternated, thereby causing an oscillatory rotation of the motor shaft 137 through the swing angle. The exemplified motor 130 does not include any spring elements to create a bias on the motor shaft 137. Rather, the oscillatory movement of the motor shaft 137 is entirely created by alternating the polarity of the magnetic field generated by the coil windings 133. As will be discussed in further detail below with respect to FIGS. 8-9, in the exemplified embodiment the coil is energized by a first voltage signal V1 at a first motor terminal 130-1 of the coil 133 and a second voltage signal V2 at a second motor terminal 130-2 of the coil causing a resulting voltage 406 across the terminals 130-1, 130-2 that alternates between positive and negative voltage, thus causing the oscillation of the drive shaft. The motor 130 further includes end cap 138 and ball bearing 139.

FIG. 8 is block diagram of a control circuit 150 for controlling the oscillation of a stem of a personal care appliance according to one embodiment. The control circuit is designed to be coupled to the motor terminals 130-1, 130-2 as discussed above to energize the electromagnetic coil 133 by one or more voltage signals. The exemplified control unit 150 includes a motor driver 152 for driving the coil 133 through the motor terminals 130-1, 130-2. The motor driver outputs voltages V1 and V2, which are coupled to the terminals 130-1, 130-2, respectively. The motor driver is coupled to a power source 140. In the exemplified embodiment, the power source is a 3.5V battery rechargeable by induction, though the invention is not limited to a particular type of power source. The motor driver 152 receives pulse width modulated signals PWM-1 and PWM-2 from a processor 151 that includes a pulse width modulation signal generator. Pulse width modulation is well known, and therefore not described here in detail Any type of pulse width modulation may be used, and it other embodiments the voltage signal need not be pulse width modulated. Further, the pulse width modulation may be altered by an input received at the user interface 202, such as the user interface 202 in FIG. 1 where a user may change the intensity within a given mode and/or may switch between a high intensity mode and a low intensity mode. The processor 151 is configured to receive the input from the user interface 202 and alter the pulse width modulated signals as necessary to alter the brushing intensity as desired by the user.

Figure 9:
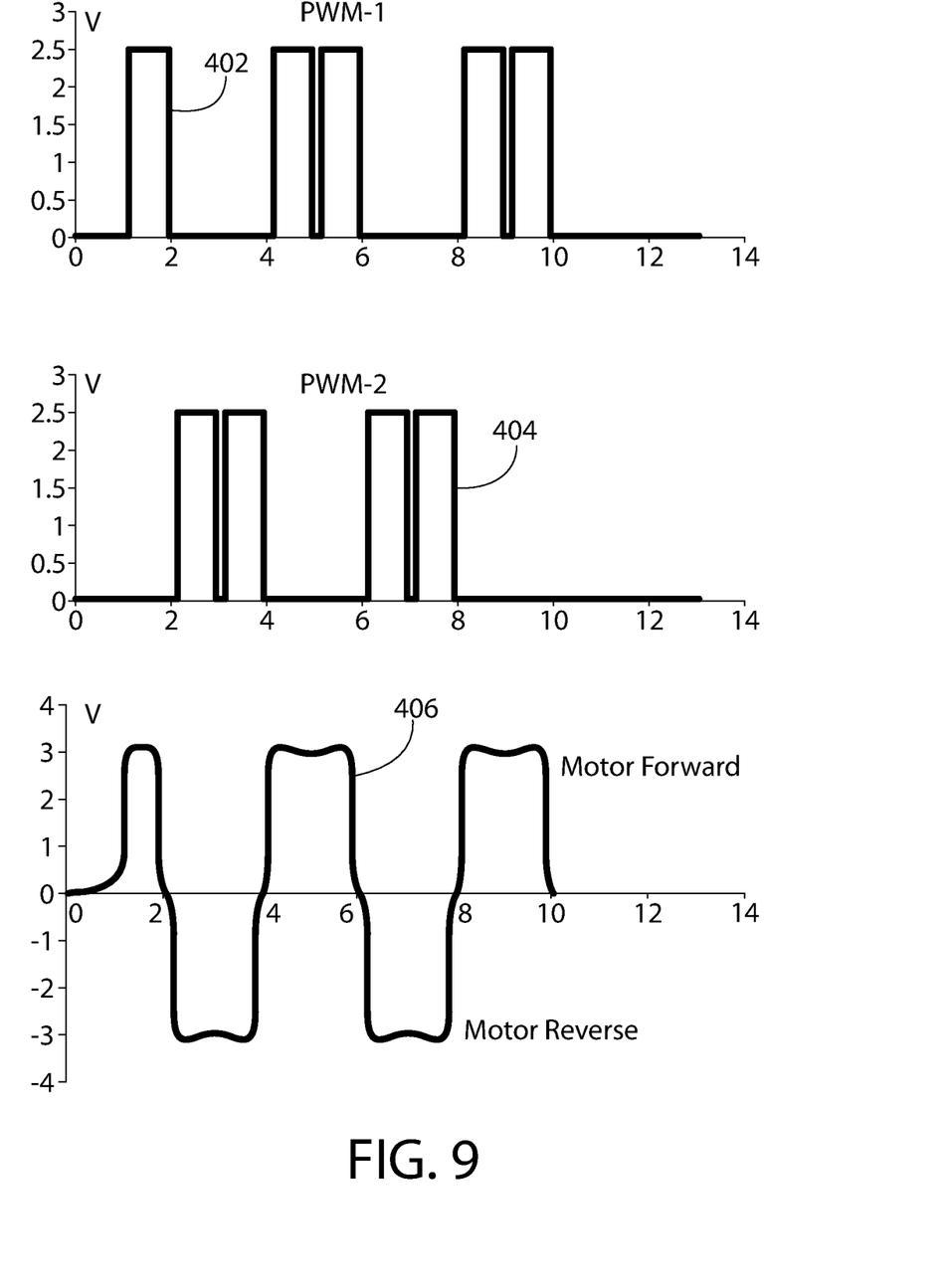
FIG. 9 shows graphs of voltage signals for oscillating a drive shaft of a motor of a personal care appliance according to one embodiment.

FIG. 9 shows graphs of voltage signals for oscillating a drive shaft of a motor of a personal care appliance according to one embodiment. Waveform 402 represents the first PWM signal PWM-1 that is provided to the motor driver 152. Waveform 404 represents the second PWM signal PWM-2 that is provided to the motor driver 152. In this embodiment, each PWM signal has a low of 0V and a high of 2.5V, and the duty cycle is 80%, though the invention is not so limited. By alternating the on time for the respective signals, the output of the motor driver 152 is enabled to rotate the drive shaft in opposing clockwise and counterclockwise directions. Due to the output of the motor driver 152 in V1 and V2 (see FIG. 8), the resulting voltage across the motor terminals 130-1, 130-2 is shown by waveform 406. The positive portion of the waveform 406 represents the rotation of the drive shaft in one direction, while the negative portion of the waveform represents the rotation of the drive shaft in the opposite direction. The voltage across the motor terminals in a working cycle is about 3.5V DC. The waveforms shown in FIG. 9 are only examples, and a variety of different voltage signals could be used to oscillate the motor.

Figure 10:
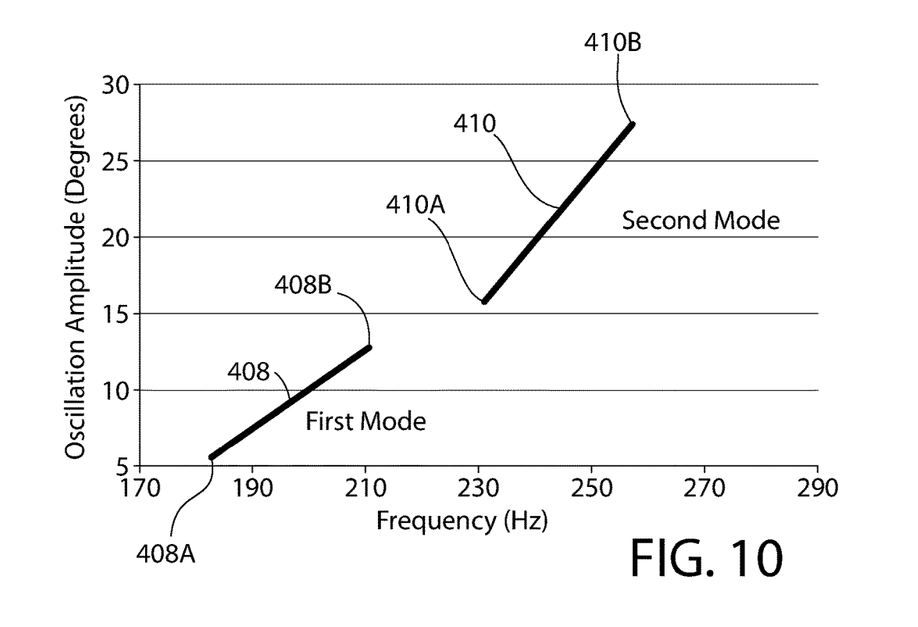
FIG. 10 shows substantially linear rate of change profiles for oscillation amplitude relative to frequency for first and second modes according to one embodiment.

FIG. 10 shows substantially linear rate of change profiles 408, 410 for oscillation amplitude relative to frequency for first and second modes according to one embodiment. As stated above, in changing the brushing intensity of the implement, such as the oscillation amplitude, there is a desire that the transition is smooth and continuous without steps or jumping. To accomplish this, the control circuit must vary the frequency and/or the duty cycle of voltage signal received by the electric motor such that the oscillation amplitude of the drive shaft is varied along a substantially linear rate of change profile relative to the frequency. As used herein, the term "substantially linear" shall mean that the profile is within an area of plus or minus 5% from a trend line. FIG. 10 shows such linear rate of change profiles 408, 410. Specifically, profile 408 is a substantially linear rate of change profile for a first mode (e.g., a low intensity mode), and profile 410 is a substantially linear rate of change profile for a second mode (e.g., a high intensity mode). In this example, the first rate of change profile 408 has a first slope and the second rate of change profile 410 has a second slope that is different from the first slope. Similarly, the first and second rate of change profiles 408, 410 have different average rates of change (e.g., when the profile is not linear). It is noted that invention is not so limited. Further, while FIG. 10 shows only two modes (high and low), in other embodiments there may be more than two modes. Further, there may alternately be a single mode having a single substantially linear rate of change profile.

The exemplified first rate of change profile 408 has (i) a first starting point 408A corresponding to a first minimum frequency (shown in Hertz) and a first minimum oscillation amplitude (shown in degrees of swing angle) for the first mode, and (ii) a first endpoint 408B corresponding to a first maximum frequency and a first maximum oscillation amplitude for the first mode. Similarly, the exemplified second rate of change profile 410 has (i) a second starting point 410A corresponding to a second minimum frequency and a second minimum oscillation amplitude for the second mode, and (ii) a second endpoint 410B corresponding to a second maximum frequency and a second maximum oscillation amplitude for the second mode. In the exemplified embodiment, the second minimum frequency is greater than the first maximum frequency, and the second minimum oscillation amplitude is greater than the first maximum oscillation amplitude. Further, the difference between the first maximum oscillation amplitude and the first minimum oscillation amplitude is less than a difference between the second maximum oscillation amplitude and the second minimum oscillation amplitude. The invention, however, is not limited to the foregoing features. For example, the profiles may have alternative starting and ending points, and need not be linear.

Figure 11:
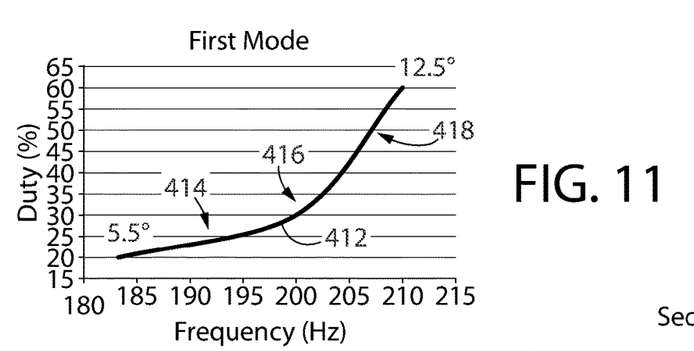
FIGS. 11-12 show non-linear rate of change profiles for duty cycle relative to frequency for causing the substantially linear rate of change profiles for oscillation in FIG. 9.
Figure 12:
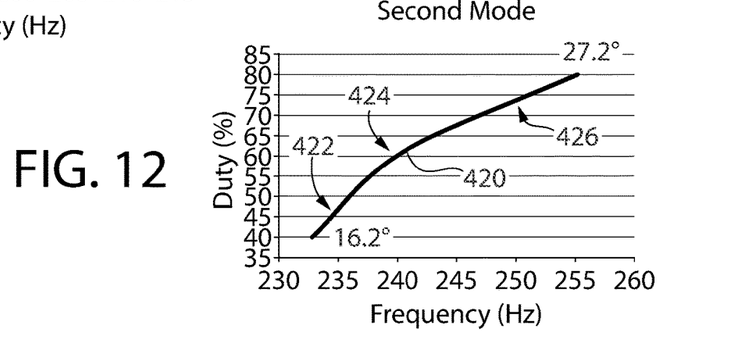

FIGS. 11-12 show that, to achieve the substantially linear rate of change profiles of FIG. 10, the control circuit can use non-linear rate of change profiles for duty cycle relative to frequency. FIG. 11 shows a non-linear rate of change profile 412 for the first mode. By altering duty cycle with respect to frequency according to this non-linear profile 412 for the first mode when altering the oscillation amplitude, the oscillation amplitude is able to change with frequency according the substantially linear profile 408 shown in FIG. 10. Similarly, by altering duty cycle with respect to frequency according to non-linear profile 420 for the second mode when altering the oscillation amplitude, the oscillation amplitude is able to change with frequency according the substantially linear profile 410 shown in FIG. 10. As shown in FIG. 11, and corresponding with first mode profile 408 of FIG. 10, the non-linear profile 412 begins at a 5.5 degrees oscillation and ends at 12.5 degrees oscillation. Similarly, in FIG. 12, corresponding with second mode profile 410 of FIG. 10, the non-linear profile 420 begins at 16.2 degrees oscillation and ends at 27.2 degrees oscillation.

As shown in FIG. 11, the non-linear rate of change profile 412 comprises (1) a first section 414 corresponding to a first range of the frequency; (2) a second section 416 corresponding to a second range of the frequency; and (3) a third section 418 corresponding to a third range of the frequency, the second range of the frequency located between the first and third ranges of the frequency and greater than the first range of the frequency. The first section 414 of the non-linear rate of change profile 412 has an average rate of change that is less than an average rate of change of the third section 418.

As shown in FIG. 12, the non-linear rate of change profile 420 similarly comprises (1) a first section 422 corresponding to a first range of the frequency; (2) a second section 424 corresponding to a second range of the frequency; and (3) a third section 426 corresponding to a third range of the frequency, the second range of the frequency located between the first and third ranges of the frequency and greater than the first range of the frequency. By contrast to FIG. 11, however, the first section 422 of the non-linear rate of change profile 420 has an average rate of change that is greater than an average rate of change of the third section 426. For both FIG. 11 and FIG. 12 (both first and second modes), however, the second section 416, 424 of the non-linear rate of change profile 412, 420 has an average rate of change that is between the average rate of change of the third section and the average rate of change of the first section. Note that the invention is not limited to the rate of change profiles shown in FIGS. 10-12, as various other frequencies, duty cycles, and oscillation amplitudes may be used taking different waveforms of different rates of change.

While the invention has been described as a system or apparatus, it may also be embodied as a method. In one embodiment, a method of controlling a personal care appliance comprising an electric motor having a drive shaft and a control circuit comprising, in operable cooperation, a user interface, a processor, a pulse width modulation signal generator, a memory unit, and a power source, the control circuit operably coupled to the electric motor, is disclosed. The method comprises generating, with the control circuit, a voltage signal having a frequency and a duty cycle; supplying the voltage signal to the electric motor to oscillate the drive shaft in an oscillatory motion having an oscillation amplitude; and the control circuit varying the frequency and the duty cycle of the voltage signal in response to an oscillation adjustment input received from the user interface so that the oscillation amplitude of the drive shaft is varied along a substantially linear rate of change profile relative to the frequency.

In another embodiment, a method of controlling a personal care appliance comprising an electric motor having a drive shaft and a control circuit comprising, in operable cooperation, a user interface, a processor, a pulse width modulation signal generator, a memory unit, and a power source, the control circuit operably coupled to the electric motor, is disclosed. The method comprises initiating a selected one of a first mode or a second mode in response to a mode selection input from the user interface; generating, with the control circuit, a voltage signal having a frequency and a duty cycle in accordance with the selected one of the first mode or the second mode; supplying the generated voltage signal to the electric motor to oscillate the drive shaft in an oscillatory motion having an oscillation amplitude; and varying the frequency and/or the duty cycle of the generated voltage signal in response to an oscillation adjustment input received from the user interface so that the oscillation amplitude of the drive shaft is varied along a first rate of change profile relative to the frequency when in the first mode; and varying the frequency and/or the duty cycle of the generated voltage signal in response to the oscillation adjustment input received from the user interface so that the oscillation amplitude of the drive shaft is varied along a second rate of change profile relative to the frequency when in the second mode, the first and second rate of change profiles being different than one another.

In yet another embodiment, a toothbrush may include a mode that combines two or more other modes. In one embodiment, the toothbrush has four selectable modes, a low intensity mode, a medium intensity mode, a high intensity mode, and a combination mode. In the combination mode, the toothbrush automatically cycles through each of the low, medium, and high intensity modes without further input from the user. In another embodiment, one of the selectable modes is in a pulsing mode in which the motor's power rapidly increases and then decreases, and in the combination mode the toothbrush cycles through the non-pulsing modes and the pulsing mode. Though as discussed below, the invention is not limited to a particular combination of modes.

Stated broadly, the invention may be understood as a toothbrush comprising a toothbrush head; an electric motor coupled to a power source, the electric motor comprising a drive shaft and configured to, in response to a voltage signal, impart a motion upon the drive shaft; a handle comprising a stem operably coupled to the toothbrush head and the drive shaft, wherein the motion of the drive shaft is imparted to the stem, and the stem imparts the motion to the refill toothbrush head; a user interface for receiving from a user a selection from among a plurality of modes, the plurality of modes comprising a first mode having a first operating characteristic of the motor; a second mode having a second operating characteristic of the motor different from the first operating characteristic; and a third mode in which the motor automatically transitions from one of the first mode and the second mode to the other of the first mode and the second mode without further user input; and a processor operably coupled to the user interface and the motor, the processor configured to alter the voltage signal supplied to the motor based on which of the plurality of modes is selected.

In one embodiment, the operating characteristics are different powers supplied to the motor. In this embodiment, the first operating characteristic comprises a first power supplied to the motor, and the second operating characteristic comprises a second power supplied to the motor, the first power being different from the second power. Additional modes could have additional different powers. The operating characteristics could alternatively (or in addition) be a frequency of the oscillation of the motor. In this embodiment, the first operating characteristic would comprise a first frequency of the oscillation of the motor, and the second operating characteristic would comprise a second frequency of the oscillation of the motor, the first frequency being different from the second frequency. An operating characteristic could also include characteristics of a pulsing of the motor, the pulsing causing a power supplied to the motor to repeatedly increase and then decrease. For example, in a combination mode the toothbrush could automatically cycle through pulsing modes of different intensities. In other embodiments, in a combination mode the toothbrush could cycle though between one or more pulsing modes and one or more non-pulsing modes. In one embodiment, at least one of the first operating characteristic and the second operating characteristic comprises a pulsing of the motor wherein a power supplied to the motor repeatedly increases and then decreases. In another embodiment, there are two or more non-pulsing modes (e.g., a first mode and a second mode, a combination mode (e.g., a third mode), and a pulsing mode (e.g., a fourth mode). In the combination mode the motor automatically transitions to each of the first (non-pulsing) mode, the second (non-pulsing) mode, and the fourth (pulsing) mode without further user input. The transitioning between the different modes (pulsing and non-pulsing) can occur in any order. Further, there can be any number of pulsing and non-pulsing modes.

The components of the toothbrush may have any of the features discussed herein. For example, the toothbrush head may be a refill toothbrush head. Further, the motor may form part of the handle, and the stem may be configured for detachable coupling with the toothbrush head. Further, while in the first mode or the second mode, a control circuit may alter a frequency and/or a duty cycle of the voltage signal in response to an oscillation adjustment input received from the user interface so that an oscillation amplitude of the drive shaft is varied along a substantially linear rate of change profile relative to the frequency by any of the methods described herein.

Further, the toothbrush may be used as part of a method for controlling an electric toothbrush, the method comprising receiving from the user, by the user interface, a selection of a combination mode (sometimes referred to as a "third mode") from a plurality of modes, the plurality of modes comprising a first mode having a first operating characteristic of the motor; a second mode having a second operating characteristic of the motor; and the combination mode. Upon receiving the selection of the third mode, the voltage signal supplied to the motor is altered to automatically cycle the motor from one of the first mode and the second mode to the other of the first mode and the second mode without further user input.

While the inventions have been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A personal care appliance comprising:
   an electric motor having a drive shaft, the electric motor configured to, in response to a voltage signal, oscillate the drive shaft in an oscillatory motion having an oscillation amplitude; and
   a control circuit comprising, in operable cooperation, a user interface, a pulse width modulation signal generator, a processor, a memory unit, and a power source, the control circuit operably coupled to the electric motor and configured to supply the voltage signal to the electric motor, the voltage signal having a frequency and a duty cycle, the control circuit configured to:
   operate the electric motor in accordance with a selected one of a first mode or a second mode in response to a mode selection input from the user interface;
   wherein when the first mode is selected, at least one of: the frequency or the duty cycle of the voltage signal is varied in response to an oscillation adjustment input received from the user interface so that the oscillation amplitude of the drive shaft is varied along a first rate of change profile relative to the frequency; and
   wherein when the second mode is selected, at least one of: the frequency or the duty cycle of the voltage signal is varied in response to the oscillation adjustment input received from the user interface so that the oscillation amplitude of the drive shaft is varied along a second rate of change profile relative to the frequency, the first and second rate of change profiles being different than one another, and the first rate of change profile and the second rate of change profile being substantially linear.

2. The personal care appliance according to claim 1 wherein the first and second rate of change profiles have different average rates of change from one another.

3. The personal care appliance according to claim 1 wherein the first rate of change profile has a first slope and the second rate of change profile has a second slope that is different than the first slope.

4. The personal care appliance according to claim 1 further comprising:
   the first rate of change profile having: (i) a first starting point corresponding to a first minimum frequency and a first minimum oscillation amplitude for the first mode; and (ii) a first endpoint corresponding to a first maximum frequency and a first maximum oscillation amplitude for the first mode; and the second rate of change profile having: (i) a second starting point corresponding to a second minimum frequency and a second minimum oscillation amplitude for the second mode; and (ii) a second endpoint corresponding to a second maximum frequency and a second maximum oscillation amplitude for the second mode;

wherein the second minimum frequency is greater than the first maximum frequency and the second minimum oscillation amplitude is greater than the first maximum oscillation amplitude.

5. The personal care appliance according to claim 1 wherein the control circuit is further configured to: (i) vary the duty cycle of the voltage signal along a first non-linear rate of change profile relative to the frequency of the voltage signal when varying the oscillation amplitude of the drive shaft along the first rate of change profile in the first mode; and (ii) vary the duty cycle of the voltage signal along a second non-linear rate of change profile relative to the frequency of the voltage signal when varying the oscillation amplitude of the drive shaft along the second rate of change profile in the second mode.

6. The personal care appliance according to claim 5 further comprising:
each of the first and second non-linear rate of change profiles comprises: (1) a first section corresponding to a first range of the frequency; (2) a second section corresponding to a second range of the frequency; and (3) a third section corresponding to a third range of the frequency, the second range of the frequency located between the first and third ranges of the frequency and greater than the first range of the frequency;
the first section of the first non-linear rate of change profile having an average rate of change that is less than an average rate of change of the third section of the first non-linear rate; and
the first section of the second non-linear rate of change profile having an average rate of change that is greater than an average rate of change of the third section of the second non-linear rate.

7. The personal care appliance according to claim 1 wherein the electric motor comprises a permanent magnet and at least one electromagnetic coil that when charged by the voltage signal generates a magnetic field that causes the drive shaft undertake the oscillatory motion as rotational oscillation, and wherein the oscillation amplitude is an angle of rotation of the drive shaft.

8. The personal care appliance according to claim 1 further comprising:
a workpiece; and
a handle comprising a gripping portion having a distal end and a stem protruding from the distal end, the stem operably coupled to the drive shaft so that the oscillatory motion of the drive shaft is imparted to the stem, the stem configured for detachable coupling with the workpiece, wherein the stem imparts the oscillatory motion to the workpiece.

9. The personal care appliance according to claim 1:
wherein the user interface is configured to receive from a user a selection from among a plurality of modes, the plurality of modes comprising:
the first mode having a first operating characteristic of the motor;
the second mode having a second operating characteristic of the motor different from the first operating characteristic; and
a third mode in which the motor automatically transitions from one of the first mode and the second mode to the other of the first mode and the second mode without further user input.

10. A method of controlling a personal care appliance comprising an electric motor having a drive shaft and a control circuit comprising, in operable cooperation, a user interface, a processor, a pulse width modulation signal generator, a memory unit, and a power source, the control circuit operably coupled to the electric motor, the method comprising:
initiating a selected one of a first mode or a second mode in response to a mode selection input from the user interface;
generating, with the control circuit, a voltage signal having a frequency and a duty cycle in accordance with the selected one of the first mode or the second mode;
supplying the generated voltage signal to the electric motor to oscillate the drive shaft in an oscillatory motion having an oscillation amplitude; and
varying at least one of: the frequency or the duty cycle of the generated voltage signal in response to an oscillation adjustment input received from the user interface so that the oscillation amplitude of the drive shaft is varied along a first rate of change profile relative to the frequency when in the first mode; and
varying at least one of: the frequency or the duty cycle of the generated voltage signal in response to the oscillation adjustment input received from the user interface so that the oscillation amplitude of the drive shaft is varied along a second rate of change profile relative to the frequency when in the second mode, the first and second rate of change profiles being different than one another, and the first rate of change profile and the second rate of change profile being substantially linear.

11. A personal care appliance comprising:
an electric motor having a drive shaft, the electric motor configured to, in response to a voltage signal, oscillate the drive shaft in an oscillatory motion having an oscillation amplitude; and
a control circuit comprising, in operable cooperation, a user interface, a pulse width modulation signal generator, a processor, a memory unit, and a power source, the control circuit operably coupled to the electric motor and configured to supply the voltage signal to the electric motor, the voltage signal having a frequency and a duty cycle, the control circuit configured to:
operate the electric motor in accordance with a selected one of a first mode or a second mode in response to a mode selection input from the user interface;
wherein when the first mode is selected, at least one of: the frequency or the duty cycle of the voltage signal is varied in response to an oscillation adjustment input received from the user interface so that the oscillation amplitude of the drive shaft is varied along a first rate of change profile relative to the frequency; and
wherein when the second mode is selected, at least one of: the frequency or the duty cycle of the voltage signal is varied in response to the oscillation adjustment input received from the user interface so that the oscillation amplitude of the drive shaft is varied along a second rate of change profile relative to the frequency, the first and second rate of change profiles being different than one another, the user interface being configured to receive from a user a selection from among a plurality of modes, the plurality of modes comprising:
- the first mode having a first operating characteristic of the motor;
- the second mode having a second operating characteristic of the motor different from the first operating characteristic; and
- a third mode in which the motor automatically transitions from one of the first mode and the second mode to the other of the first mode and the second mode without further user input.

12. The personal care appliance according to claim 11 wherein the first and second rate of change profiles have different average rates of change from one another.

13. The personal care appliance according to claim 11 wherein the first rate of change profile has a first slope and the second rate of change profile has a second slope that is different than the first slope.

14. The personal care appliance according to claim 11 further comprising:
- the first rate of change profile having: (i) a first starting point corresponding to a first minimum frequency and a first minimum oscillation amplitude for the first mode; and (ii) a first endpoint corresponding to a first maximum frequency and a first maximum oscillation amplitude for the first mode; and
- the second rate of change profile having: (i) a second starting point corresponding to a second minimum frequency and a second minimum oscillation amplitude for the second mode; and (ii) a second endpoint corresponding to a second maximum frequency and a second maximum oscillation amplitude for the second mode;
- wherein the second minimum frequency is greater than the first maximum frequency and the second minimum oscillation amplitude is greater than the first maximum oscillation amplitude.

15. The personal care appliance according to claim 11 wherein the control circuit is further configured to: (i) vary the duty cycle of the voltage signal along a first non-linear rate of change profile relative to the frequency of the voltage signal when varying the oscillation amplitude of the drive shaft along the first rate of change profile in the first mode; and (ii) vary the duty cycle of the voltage signal along a second non-linear rate of change profile relative to the frequency of the voltage signal when varying the oscillation amplitude of the drive shaft along the second rate of change profile in the second mode.

16. The personal care appliance according to claim 15 further comprising:
- each of the first and second non-linear rate of change profiles comprises: (1) a first section corresponding to a first range of the frequency; (2) a second section corresponding to a second range of the frequency; and (3) a third section corresponding to a third range of the frequency, the second range of the frequency located between the first and third ranges of the frequency and greater than the first range of the frequency;
- the first section of the first non-linear rate of change profile having an average rate of change that is less than an average rate of change of the third section of the first non-linear rate; and
- the first section of the second non-linear rate of change profile having an average rate of change that is greater than an average rate of change of the third section of the second non-linear rate.

17. The personal care appliance according to claim 11 wherein the electric motor comprises a permanent magnet and at least one electromagnetic coil that when charged by the voltage signal generates a magnetic field that causes the drive shaft undertake the oscillatory motion as rotational oscillation, and wherein the oscillation amplitude is an angle of rotation of the drive shaft.

18. The personal care appliance according to claim 11 further comprising:
- a workpiece; and
- a handle comprising a gripping portion having a distal end and a stem protruding from the distal end, the stem operably coupled to the drive shaft so that the oscillatory motion of the drive shaft is imparted to the stem, the stem configured for detachable coupling with the workpiece, wherein the stem imparts the oscillatory motion to the workpiece.

* * * * *